United States Patent [19]

Magnus

[11] Patent Number: 4,615,822

[45] Date of Patent: Oct. 7, 1986

[54] COMPATIBILIZED POLYESTER POLYOL BLEND FROM PHTHALIC ANHYDRIDE BOTTOMS

[75] Inventor: George Magnus, Arlington Heights, Ill.

[73] Assignee: Stepan Company, Northfield, Ill.

[21] Appl. No.: 711,629

[22] Filed: Mar. 13, 1985

Related U.S. Application Data

[63] Continuation-in-part of Ser. No. 507,532, Jun. 27, 1983, Pat. No. 4,521,611, which is a continuation-in-part of Ser. No. 381,298, May 24, 1982, abandoned.

[51] Int. Cl.⁴ ............................ C09K 3/00; C08K 5/10
[52] U.S. Cl. .................... 252/182; 252/315.4; 252/544; 521/112; 521/118; 521/172; 524/220; 524/386; 524/387; 524/389; 528/83; 528/272; 528/274; 560/89; 560/91; 560/94
[58] Field of Search ............... 524/605, 386, 387, 389, 524/766, 220; 528/83, 272, 274; 521/112, 118, 172; 252/182; 560/91, 89, 94

[56] References Cited

U.S. PATENT DOCUMENTS

| | | | |
|---|---|---|---|
| 3,459,733 | 8/1969 | Byrd, Jr. et al. | 260/210 |
| 3,505,377 | 4/1970 | Morehouse | 260/448.2 |
| 3,563,924 | 2/1971 | Schwarz | 260/2.5 |
| 4,018,815 | 4/1977 | Vogt et al. | 560/91 |
| 4,039,487 | 8/1977 | Kolakowski et al. | 260/2.5 |
| 4,246,365 | 1/1981 | Wiedermann et al. | 521/172 |
| 4,347,330 | 8/1982 | Demou et al. | 521/110 |

OTHER PUBLICATIONS

Reymore et al., article entitled: "Novel Isocyanurate Foams Containing No Flame Retardant Additives", Journal of Cellular Plastics (Nov./Dec. 1978), pp. 332-340.

*Primary Examiner*—Natalie Trousof
*Assistant Examiner*—Vera C. Clarke
*Attorney, Agent, or Firm*—Hill, Van Santen, Steadman & Simpson

[57] ABSTRACT

A new and highly useful resin prepolymer blend of (a) polyester polyols prepared by esterifying phthalic anhydride bottoms with aliphatic polyols; (b) aliphatic polyol, (c) compatibilizing polyalkoxylated compound, and (d) (optionally) polyalkoxylated amine or amide diol. This blend can be reacted with organic isocyanates in the presence of fluorocarbon blowing agent and preferably catalysts to produce cellular polymeric structures.

12 Claims, No Drawings

COMPATIBILIZED POLYESTER POLYOL BLEND FROM PHTHALIC ANHYDRIDE BOTTOMS

RELATED APPLICATIONS

This application is a continuation-in-part of my earlier filed U.S. patent application Ser. No. 507,532 filed June 27, 1983, now U.S. Pat. No. 4,521,611, which in turn is a continuation-in-part of my earlier filed U.S. patent application Ser. No. 381,298 filed May 24, 1982, now abandoned.

BACKGROUND OF THE INVENTION

1. Field Of The Invention

This invention lies in the field of compatibilized polyester polyol resin prepolymer blend compositions, to techniques for making and using the same, and to the products made therewith.

2. Prior Art

In my above identified copending U.S. patent application there is described a new and very useful class of aromatic ester polyols which are useful as intermediates for reaction with isocyanates to produce cellular polyurethane and polyisocyanurate polymers. Such ester polyols are prepared from phthalic anhydride bottoms by reacting such with polyol under liquid phase conditions, all as taught in such copending applications, whose entire disclosure is incorporated hereinto by reference.

Such polyester polyols which result from so esterifying phthalic anhydride bottoms with aliphatic polyols are useful in the manufacture of cellular polyurethane and cellular polyisocyanurate polymers. Such polymers are manufactured by reacting polyfunctional organic isocyanates with such polyester polyols in the presence of a blowing agent and (usually) a catalyst.

As those skilled in the art appreciate, it is common in the foam art to prepare resin blends (sometimes also called resin precursor blends) which typically comprise homogeneous mixtures of polyol blends, blowing agent, polymerization catalyst, and, optionally but preferably, cell stabilizing surfactant. By the term "resin blend" or "resin prepolymer blend" as used herein conventional reference is made to a liquid composition which is reactive with isocyanates in the presence of blowing agent to produce a polyurethane or polyisocyanurate foam.

Particularly because of the amount of fluorocarbon blowing agent commonly used in a resin precursor blend, a problem in compatibility between the polyol (especially aromatic polyester polyols) and such fluorocarbon may arise. Unless the polyol and the fluorocarbon blowing agent are compatible with one another, optimized product foam properties may not be achieved. While sometimes a blend of different polyols in a single resin precursor blend can overcome fluorocarbon compatibility problems, such compatibility problems are preferably overcome by adding a compatibility agent to the resin precursor blend. The compatibility agent functions to compatibilize the polyols and fluorocarbon blowing agents so that homogeneity results in a product resin precursor blend as desired in order to produce foams of uniform quality and desired characteristics.

Certain monofunctional hydroxyl terminated nonionic surfactants, such as, for example, polyethoxylated alkyl phenol nonionics that contain not more than about 15 moles of condensed ethylene oxide per molecule, and thus which have molecular weights substantially below about 900, are believed to have been heretofore used as compatibility agents for certain polyol/fluorocarbon blowing agent resin precursor systems, for example, systems of the type wherein the polyol is a polycarbomethoxy-substituted) diphenyl or a benzyl ester (such as is commonly available commercially under the trademark "Terate" from Hercules Inc.

Also, a class of amide diols is disclosed in Koehler et al U.S. Pat. No. 4,246,364 as being useful compatibility agents for blends of such polyols with fluorocarbon blowing agents, particularly when material of such class of amide diols is employed at the relatively high rate from about 20 to 85 weight percent (apparently on a 100 weight percent total polyol blend composition weight basis). When such a large quantity of amide diol is employed, the cost of resin prepolymer blend increases (because of the cost of the amide diol).

The polyester polyols prepared by esterifying phthalic anhydride bottoms with aliphatic polyols (as described in my aforereferenced copending U.S. patent application) are characteristically black-colored liquids. No way is known at present for measuring compatibility between such polyester polyols and fluorocarbon blowing agents added thereto other than by the procedure of reacting a composition of such polyester polyol and fluorocarbon blowing agent with isocyanate to produce a cellular foam products whose properties can then be observed and measured. Based upon such a foam conversion procedure, it has been determined that the properties of product foam are substantially improved when a starting resin precursor blend of such a polyester polyol and fluorocarbon blowing agent is formulated with certain compatibility agents.

BRIEF SUMMARY OF THE INVENTION

More particularly, the present invention concerns a new and very useful resin prepolymer blend which is useful in the preparation of polyurethane and polyisocyanurate foams which blend comprises on a 100 weight percent total composition basis:

(A) from about 25 to 50 weight percent of an ester polyol composition, (B) from about 2 to 45 weight percent of at least one polyol of the formula:

$$HO-R^1-OH \quad (1)$$

wherein $R^1$ is a divalent radical selected from the group consisting of:

(1) alkylene radicals each containing from 2 through 6 carbon atoms, (2) radicals of the formula:

$$-CH_2-R^2-CH_2-$$

where $R^2$ is a radical selected from the group consisting of:

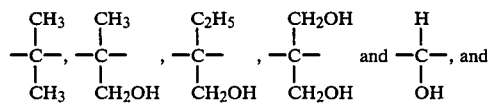

(3) radicals of the formula:

$$-(R^3O)_n-R^3-$$

where $R^3$ is an alkylene radical containing from 2 through 3 carbon atoms, and n is an integer of from 1 through 3 inclusive, and (C) from about 5 to 30 weight percent of at least one nonionic polyalkoxylated (compound of the generic formula):

$$RO(Y)_n-H \qquad (2)$$

wherein:

R is a radical selected from the group consisting of alkyl phenyl radicals wherein the alkyl group in each such radical contains from about seven to eighteen carbon atoms; alkyl radicals each containing from seven through eighteen carbon atoms;

Y is selected from the group consisting of radicals of the formula: $(CH_2CH_2O)$, and mixed radicals of the formula

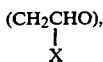

and $(CH_2CH_2O)$ where the ratio of $(CH_2CH_2O)$ to

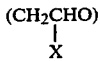

ranges from 1:1 to 1:15

X is selected from the group consisting of methyl and hydrogen, and n is a positive whole number ranging from about 4 to 25, In such prepolymer blend, such ester polyol composition (independently of formula (1) polyol), is characterized by containing on a total ester polyol composition basis:

(A') from about 7.0 to 45 weight percent of acetone insolubles, and (B') from about 55 to 93 weight percent of esters produced by the reaction of phthalic anhydride with said polyol, In any given such resin prepolymer blend, the starting ester polyol composition is a phthalic anhydride bottoms composition which has been esterified with polyol of formula (1) by the method described in my aforesaid copending U.S. patent application 507,532. This composition is preferably characterized by initially containing on a 100 weight percent total such starting phthalate bottoms composition basis:

(1) from about 50 to 95 weight percent of phthalic acid anhydride, (2) from about 1 to 20 weight percent of at least one compound selected from the group consisting of trimellitic acid and trimellitic acid anhydride, and (3) from about 3 to 40 weight percent of unknown acetone insolubles, and by having (4) an acid number ranging from about 380 to 750, and (5) an hydroxyl number of substantially zero.

Also in such a resin prepolymer blend composition, the contacting of phthalic anhydride bottoms composition with such polyol is conducted under conditions such that the initial mole ratio of such polyol to such phthalic anhydride bottoms composition ranges from about 2 to 4 based on an estimate of the total carboxylic acid and carboxylic acid anhydride content of such phthalic anhydride bottoms composition. Such contacting is preferably continued until the hydroxyl number of the resulting mixture reaches a value ranging from about 190 to 600 and the acid number of the resulting mixture reaches a value ranging from about 0.01 to 7.

Also, in any given such resin prepolymer blend composition, such polyol is preferably diethylene glycol.

This invention is also directed in another aspect to resin prepolymer blend compositions as above described which additionally contain an isocyanate polymerization catalyst (which will cause, upon reaction with isocyanate and resin prepolymer blend production of polyurethane, polyisocyanurate, or mixed foam structure).

This invention is also directed in another aspect to a process for the preparation of polyurethane and polyisocyanurate cellular polymers which utilize, as a blended component, the above described resin blend composition and an isocyanate polymerization catalyst.

This invention is further directed in another aspect to the cellular polyurethane and polyisocyanurate polymer produced from the practice of the above process.

One primary purpose of the present invention is to provide new resin blends which are compatible with fluorocarbon blowing agents and which find utility either by themselves or as minor components in the preparation of new polyurethane and polyisocyanurate foams, particularly those foams prepared in conventional foam laminate machinery and by conventional pour-in-place foam equipment, and which have physical and chemical properties of commercially acceptable level as regards typical in use applications for prior art polyurethane and polyisocyanurate foams, especially in building construction for thermal insulation.

Another primary purpose of the present invention is to provide fluorocarbon compatibilized resin blends of the type indicated above which can contain significant quantities of aromatic ester polyol compositions produced by esterifying phthalic anhydride bottoms compositions with a polyol as described herein and which can also contain commercially quantities of a fluorocarbon blowing agent apparently homogeneously dispersed therein.

Another primary purpose of the present invention is to provide resin free polymer blends of the class indicated above which contain one or more of the compatibility agents as herein disclosed and which produce a storage stable system of low viscosity which when foamed produces an acceptable polyurethane or polyisocyanurate foam.

Other and further objects, aims, purposes, features, advantages, embodiments, and the like will be apparent to those skilled in the art from the teachings of the present specification taken with the claims.

DETAILED DESCRIPTION

The resin prepolymer blends of the present invention are prepared by simply mixing together, in the quantities above indicated, the respective above indicated components in any suitable mixing zone (vessel, tank, etc.).

Preferably, in a resin prepolymer blend of this invention, the ester above described phthalate bottoms derived polyol composition is employed within a range from about 25 to 50 weight percent, the above described polyol of formula (1) is employed within a range from about 2 to 35 weight percent, and the above described polyalkoxylated compound is employed in a range from about 5 to 20 weight percent, on a 100 weight percent total composition basis.

The ester polyol compositions of the present invention are prepared by the procedures described in my above referenced copending U.S. patent application. Also, the polyols and preferred polyols employed in the resin blends of the present invention are as described in such copending U.S. patent application.

As indicated above, preferred resin prepolymer blends of the present invention contain a fluorocarbon (and optionally water). Advantageously, and unexpectedly, such a fluorocarbon blowing agent is miscible with the resin blend. Typically, in a resin blend of this invention, when such a fluorocarbon is present, the quantity present is at least about 10 weight percent, and preferably at least about 20 weight percent on a 100 weight percent total blend composition basis. Up to about 50 weight percent by weight of a resin prepolymer blend of this invention can comprise fluorocarbon blowing agent with the balance up to 100 weight percent thereof being comprised of ester polyol composition, polyol, and polyalkoxylated compound, as above described. Up to about 10 weight percent of water can also be present in a resin prepolymer blend when fluorocarbon is present.

The particular percent of fluorocarbon blowing agent to be dissolved in any given blend influences the exact, or optimized, respective quantities of the individual components employed in a resin blend.

The fluorocarbon blowing agent can be any of the fluorocarbons known to those skilled in the art and which can be used for blowing polymer mixtures into cellular polyisocyanurates. In general, such blowing agents can be, if desired, additionally substituted by chlorine and/or bromine in addition to the fluorine content. Suitable initially liquified blowing agent low boiling gases include aliphatic and cycloaliphatic fluorocarbons which vaporize at or below the temperature of the foaming mass. Such gases are at least partially fluorinated and may also be otherwise halogenated. Illustrative of presently preferred fluorocarbon blowing agents are trichloromono-fluoromethane, dichlorodifluoromethane, 1,1-dichloro-fluoroethane, 1,1,1-trifluoro-2-fluoro-3,3-difluoro-4,4,4-trifluorobutane, hexafluorocyclobutene, octafluorocyclobutane, and the like; see also U.S. Pat, No. 3,745,133, column 11, lines 25 to 38 which disclosure relating to fluorocarbon blowing agents is incorporated by reference herein.

As indicated above, unexpectedly, it appears to be advantageous for a product resin blend composition of this invention to contain a quantity of unreacted (excess) polyol of formula (1) above in the range indicated. The quantity of the formula (1) polyol present in any given instance appears to be dependent upon the effects or results desired (as in a resin blend prepared from a product composition of this invention) so that the exact amount is thus a choice of the user. The presence of such an excess appears to have various beneficial effects. For one thing, the compounding of a starting phthalate bottoms ester polyol composition into a resin blend containing a fluorocarbon blowing agent, such as can be accomplished when formulating a product ester polyol compostion of this invention to be used for subsequent reaction with an isocyanate in the presence of a catalyst to produce a product foam, appears to be beneficial because such formula (1) polyol excess in some cases, exerts a compatibilizing effect between the fluorocarbon blowing agent and the starting ester polyol composition (wherein the fluorocarbon blowing agent appears to be soluble or compatible only to a limited extent without the presence of some sort of compatibility agent). For another thing, the reactivity of (a) such a formulated resin blend of starting ester polyol composition with excess polyol of formula (1) and the indicated compatabilizing agent and a conventional organoisocyanate, in the presence of a catalyst, especially a conventional trimerization catalyst of the type used to make polyisocynaurate foams, appears to be accelerated by the presence of such an excess, as demonstrated, for example, by a characteristically shorter initial cream time and a shorter tack free time in a foaming and freshly foamed cellular product, as compared to, for example corresponding respective such times associated with a corresponding reaction of a formulated resin blend of starting ester polyol composition that contains very little, or even substantially no, excess formula (1) polyol. For still another thing, the cellular product formed from reaction of such a formulated resin blend containing excess formula (1) polyol and conventional isocyanate (in the presence of catalyst, especially a conventional trimerization catalyst) appears to have a better blush and a reduced friability, compared to, for example, corresponding cellular product produced with formulated resin blend of product ester polyol composition that contains very little, or even substantially no, excess formula (1) polyol. For still another thing, the ambient temperature fluidity of a starting ester polyol composition seems to be improved, and the liquid viscosity thereof lowered, by the presence of excess formula (1) polyol in combination therewith which permits ready and convenient blending of such a composite composition with other ingredients to produce a resin blend. The reasons for these various beneficial effects are not definitely known or understood at this time.

The quantity of such an excess of formula (1) polyol used in combination with a starting ester polyol composition and the indicated compatibilizing agent which produces such a beneficial effect in the product blend as above indicated presently appears to be preferably in the range from about 2 to about 45 weight percent based on 100 weight percent combined or composite composition of a product ester polyol composition and excess of at least one formula (1) polyol, though larger and smaller amounts of such a formula (1) polyol excess can be employed, if desired. The quantity of excess unreacted polyol formula(s) present in a starting ester polyol composition of this invention can be estimated by any convenient procedure. One presently preferred procedure is to employ gas chromatography. The difference between the amount of unreacted polyol (e.g., of formula (1)) and the balance up to 100 weight percent of any given starting ester polyol composition of this invention can be used conveniently as an estimate for the actual amount of phthalate polyester polyol present.

As used herein, the term "initial cream time" has reference to the time required for foaming to commence in a fully mixed system of resin blend and isocyanate (including catalyst) using starting materials at 25° C.

Similarly, the term "tack free time" has reference to time required from initial mixing for a foam to achieve a condition such that an exposed surface thereof is tack free when contacted lightly by a human finger or the like.

Similarly, the term "blush" has reference to the visual or optical appearance of the surface of a foam after total foam rise and achievement of tack free time.

Similarly, the term "friability" has reference to the condition of the surface of a foam which has achieved a total foam rise and a tack free condition, as determined by moving a human finger or the like over such surface and visually observing whether crumbling or crushing of such surface is observed and, if so, the approximate extent thereof.

The combination of such an excess of formula (1) polyol with starting ester polyol composition appears to cause an elevation of the hydroxyl number associated with a product resin prepolymer blend composition, and such increase in hydroxyl number is generally proportional to the quantity of such excess present. The type of formula (1) polyol and the quantity of the excess thereof present may influence the first value of the hydroxyl number existing in any given resin prepolymer blend containing starting ester polyol composition. Owing to the possible compositional variations in a starting ester polyol composition, it is not presently possible to provide information about exact respective quantities of starting ester polyol composition and of formula (1) polyol which will produce a given hydroxyl number in a product resin prepolymer blend.

However, and for example, in the case of a preferred starting ester polyol composition prepared by using a preferred phthalic anhydride bottoms composition, and, as the formula (1) polyol, diethylene glycol, and by using preferred esterification conditions as taught in U.S. Ser. No. 507,532 it is observed that the hydroxyl number of such a product resin blend composition appears to be elevated by about 10 for each 1 weight percent of added or excess diethylene glycol on a total product composition weight percent basis. Also multifunctional (polyhydroxylated) polyols of formula (1) appear to elevate the hydroxyl number of a product resin blend composition at a faster rate per quantity therein present than is associated with dihydroxylated polyols of formula (1). Presently available information suggests that the hydroxyl number of a product resin blend is preferably kept below about 380, especially when the manufacture of polyisocyanurate foams is contemplated therefrom, but composite compositions having higher hydroxyl numbers can be prepared and utilized to make resin blends, if desired, as those skilled in the art will appreciate.

At the present time, no means is known for quantitatively correlating the hydroxyl number of a resin blend composition with one or more of the beneficial effects above described; the number of variables involved apparently makes such a generalization exceedingly difficult, if not impossible, to achieve.

For a given formulated resin blend containing a starting ester polyol composition with excess formula (1) polyol (particularly diethylene glycol), available data indicates that when the hydroxyl number is within the preferred range of 270 to 480, the resin blend will produce a desirable or useful combination of beneficial effects, such as those described above. By simple conventional experimentation, those skilled in the art can and will routinely correlate for a particular system the hydroxyl number of a composite resin blend composition with such beneficial effects.

For example, one presently preferred class of resin blends produced from more preferred product ester polyol compositions of the present invention using diethylene glycol as the formula (1) polyol is characterized by having the following formulation:

TABLE I

| Resin Prepolymer Blend | |
|---|---|
| Component[1] | Preferred (100 wt % basis) |
| (1) ester polyol composition[2] | 25–50 |
| (2) total content of unreacted diethylene glycol[3] | 2–35 |
| (3) fluorocarbon (low molecular weight fluorinated alkane) | 25–40 |
| (4) ethoxylated alkyl phenol | 5–20 |
| (5) dimethylpolysiloxane polyalkylene oxide copolymer | 0.5–3 |
| (6) polyisocyanurate catalyst | 1–7 |
| (7) flame retardant | 0–15 |
| (8) ethoxylated cocoamine[4] | 0–20 |

Table I Footnotes:
[1]The individual components are preferably so selected that a product resin blend has a hydroxyl number preferably ranging from about 100 to 300 and a viscosity preferably ranging from about 100 to 3000 centipoises (both measured as herein above described).
[2]Calculated as difference from gas chromatographic analysis of unreacted polyol content of a polyester polyol product composition of this invention. The ester polyol composition is characterized by containing on a total resin blend composition basis:
(A) from about 7.0 to 45 weight percent of acetone insolubles, and
(B) from about 55 to 93 weight percent of esters produced by the reaction of phthalic anhydride with diethylene glycol,
said ester polyol composition having been produced by contacting a phthalic anhydride bottoms composition with diethylene glycol while maintaining liquid phase reaction conditions and a temperature ranging from about 190 to 250° C. using an initial mole ratio of said diethylene glycol to said phthalic anhydride bottoms composition of from about 2 to 4 based on an estimate of the total carboxylic acid and carboxylic acid anhydride content of said phthalic anhydride bottoms composition.
[3]Includes unreacted polyol present in a product polyester polyol composition plus added polyol.
[4]Usually used in an amount ranging from about 1.5 to 12 weight percent.

Preferably a resin blend additionally contains dissolved therein from about 25 to 40 weight percent of a low molecular weight fluorinated alkane on a total weight basis.

Preferably a resin blend additionally contains dissolved therein from about 0.5 to 3 weight percent of a dimethyl polysiloxane polyalkylene oxide copolymer on a total weight basis as a cell stabilizing surfactant.

Preferably a resin blend additionally contains dissolved therein from about 1 to 7 weight percent of a polyisocyanurate catalyst on a total weight basis.

Preferably a resin blend additionally contains dissolved therein from greater than 0 up to about 15 weight percent of a flame retardant on a total weight basis.

Preferably, a resin blend utilizes as the wherein said nonionic polyalkoxylated compound an ethoxylated alkyl phenol.

Preferably a resin blend additionally contains on a total weight basis from greater than 0 up to about 20 weight percent of at least one diol of the formula:

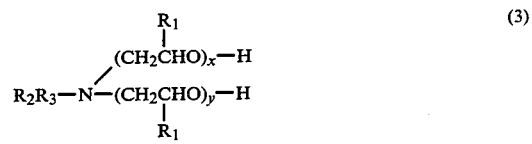

(3)

wherein:
each $R_1$ is independently selected from the group consisting of hydrogen and methyl,
$R_2$ is an aliphatic radical having from 7 to 35 carbon atoms inclusive,
$R_3$ is a divalent radical selected from the group consisting of

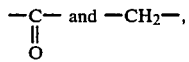

and x and y are each a positive whole number having an average value between about one and twenty inclusive.

Preferably, the diol of formula (3) comprises an ethoxylated cocoamine containing from about 5 to 15 moles of combined ethylene oxide per molecule or an ethoxylated cocamide containing from about 5 to 15 moles of combined ethylene oxide per molecule.

In a preferred embodiment of a resin blend of this invention, there is additionally present an isocyanate polymerization (preferably trimerization) catalyst on a total weight basis in a range from about 0.5 to 10 weight percent with the balance of about 90 to 99.5 weight percent comprising a polyol blend composition of this invention containing also fluorocarbon blowing agent. Preferably this range extends from about 2 to 8 weight percent with the balance (92 to 98 weight percent) being such a polyol blend composition and fluorocarbon blowing agent.

Minor amounts (typically less than about 15 wt %) of other optional additives can be added to a blend composition of this invention without detracting from the miscibility and stability of product blends. Such other additives include, for example, nonreactive and reactive flame retardants and the like which are commonly employed in the art of making cellular polyisocyanurates.

Surprisingly, the fluorocarbon blowing agent and the resin blend (with or without the presence of such catalyst) are completely miscible in each other with no separation occurring during storage, such miscibility being due to the presence of compound(s) of formulae (1) and (2). A resin polyol blend composition with miscible added fluorocarbon blowing agent and catalyst and optional cell stabilizing surfactant may be reacted with organic isocyanates to produce, for example, product polyisocyanurate foams having acceptable physical properties, such as foam stability, friability, compressive strength, and the like.

In the preparation of a polyisocyanurate foam of the present invention, a resin blend composition in admixture with a fluorocarbon (and optionally water) blowing agent, preferably a cell stabilizing surfactant, and preferably a polymerization (preferably a trimerization) catalyst, forms a so-called resin precursor blend or B side component or composition for reaction with a so called A side component or composition comprised of organic polyisocyanate. The respective preferred quantities of B side blend components are as indicated above in Table I. Thus, for example, a B blend contains from about 0.5 to 10, preferably about 3 to 6, weight percent of a trimerization catalyst, and the balance comprises from about 90 to 99.5, preferably about 94 to 97, weight percent, of resin blend composition in combination with fluorocarbon blowing agent is present in the range from about 10 to 50 weight percent (same basis), with the balance of B side blend components thus being from about 50 to 90 (total weight basis).

In a mixture of B side blend and A side blend, the total hydroxyl equivalents present in such a B side blend at the time of reaction ranges from about 0.20 to 0.50 (and preferably from about 0.20 to 0.40) per isocyanate equivalent of such A side polyisocyanate.

A class of presently preferred resin prepolymer blend formulations of this invention are characterized as shown in Table II below:

TABLE II

Composition of Preferred Resin Prepolymer Blends
(100 weight percent basis)

| No. | Component | Preferred wt. % range | More Preferred wt % range |
|---|---|---|---|
| 1. | ester polyol composition | 25–50 | 30–40 |
| 2. | Formula (1) polyol | 2–35 | 5–10 |
| 3. | Formula (2) polyalkoxylated compound | 5–20 | 8–15 |
| 4. | Formula (3) diol | 0–20 | 2–10 |
| 5. | fluorocarbon blowing agent | 25–40 | 30–35 |
| 6. | water | 0.05–10 | 0.1–1.0 |
| 7. | trimerization catalyst | 1.0–7.0 | 3–6 |
| 8. | cell stabilizing surfactant | 0.5–3 | 1–2 |

It is preferred to employ in the Table II compositions as shown from about 1 to 3 weight percent of (based on total resin or B side component blend) a cell stabilizing surfactant which improves and promotes development of fine, uniform foam cells. Presently preferred such cell stabilizing surfactants are commercially available and include silicones, such as dimethyl polysiloxane-polyalkylene oxide copolymers. Organic cell stabilizing surfactants are also known to this art.

Preferred resin blend formulations of Table II utilize as shown second hydroxyl containing polyols. More preferred second hydroxyl containing polyols are presently dialkylene glycols, such as diethylene glycol, dipropylene glycol, and polyalkoxylated glycerines containing from about 3 to 6 moles of condensed alkylene oxide.

A trimerization catalyst employed in the practice of this invention can be any catalyst known to those skilled in the art which will catalyze the trimerization of an organic isocyanate compound to form the isocyanurate moiety.

The organic polyisocyanates employable in the practice of this invention can be the same as those previously employed in the art for making polyisocyanurates. Such materials are well known to those skilled in the art.

Among the suitable polyisocyanates are those represented by the general formula:

$$Q(NCO)_i \qquad (4)$$

wherein:

i has an average value of at least two, and

Q is an aliphatic, cycloaliphatic or aromatic radical which can be an unsubstituted hydrocarbyl group or a hydrocarbyl group substituted, for example, with halogen or alkoxyl.

For example, Q can be an alkylene, cycloalkylene, arylene, alkyl-substituted cycloalkylene, alkylene or aralkylene radical including corresponding halogen-substituted radicals. Typical examples of suitable polyisocyanates known to the art for use in preparing cellular polyisocyanurates are: 1,6-hexamethylene diisocyanate, 1,4-tetramethylene diisocyanate, 1-methyl-2,4-diisocyanatocyclohexane, bis(4-isocyanatophenyl)methane, phenylene diisocyanates such as 4-methoxy-1,3-phenylenediisocyanate, 4-chloro-,3-phenylenediisocyanate, 4-bromo-1,3-phenylenediisocyanate, 5,6-dimethyl-1,3-phenylenediisocyanate, 2,4-tolulene diisocyanates, crude tolylene diisocyanate, 6-isopropyl-1,3- phenylenediisocyanate, durylene diisocyanate and triphenylmethane-4,4',4''-triisocyanate. Other suitable polyisocyanate reactants are ethylphosphonic diisocyanate and phenylphosphonic diisocyanate. Also useful are the polyisocyanates of the aniline-formaldehyde polyaromatic type which are produced by phosgenation of the polyamine obtained by acid catalyzed condensation of aniline with formaldehyde. Polyphenylmethylene polyisocyanates of this type are available commercially under such trade names as PAPI, Mondur, Rubinate, and the like. These products are low viscosity (50–1000 centipoises at 25° C.) liquids having average isocyanate functionalities in the range of about 2.0 to about 3.2 or higher, depending upon the specific aniline-to-formaldehyde molar ratio used in the polyamine preparation. Other useful polyisocyanates are combinations of diisocyanates with polymeric isocyanates containing more than two isocyanate groups per molecule. Illustrative of such combinations are: a mixture of 2,4-toluene diisocyanate, 2,6-toluene diisocyanate and the aforesaid polyphenyl-methylene polyisocyanates; and a mixture of isomeric toluene diisocyanates with polymeric toluene diisocyanates obtained as residues from the manufacture of the diisocyanates.

One presently preferred polyfunctional organic polyisocyanate comprises polymethylene polyphenyl polyisocyanates containing significant levels of the 2-4'-isomer as disclosed, for example, in U.S. Pat. No. 3,362,979. A presently most preferred organic polyisocyanate is a mixture containing from about 30 to 85 weight percent of methylene bis(phenylisocyanate) with the remainder being polymethylene polyphenyl polyisocyanate of funtionality higher than 2.0 (on a 100 weight percent total polyisocyanate basis).

In making polyisocyanurate foams of this invention, espcially laminates of such foams, the procedures and equipment conventional in the art are employed; see, for example, U.S. Pat. No. 3,896,052.

One preferred compatibility agent of this present invention comprises in combination on a 100 weight percent total agent basis:
from about 40 to 80 weight percent of at least one compound of formula (3),
from about 20–60 weight percent of at least one compound of formula (2), and
from 0 to 40 weight percent of at least one compound of formula (1).
In such a compatibility agent, one presently preferred formula (3) material is an ethoxylated cocoamine or an ethoxylated cocamide wherein the number of moles of combined ethylene oxide ranges from about 5 to 15. Similarly, one presently preferred formula (1) compound is diethylene glycol. The presence of such a formula (1) compound aids in making this agent exist in a liquid or slurry form and also serves in making this agent more reactive [after blending with an aromatic ester polyol and with other materials as described herein to produce polyol blends and resin blends for reaction with isocyanates to produce preferably polyisocyanurate foams].

EMBODIMENTS

The following examples are merely illustrative of the present invention and are not intended as a limitation upon the scope thereof.

EXAMPLE 1

A specimen of a phthalic anhydride bottoms composition is obtained having:
(a) a phthalic anhydride content of about 60 weight percent (total composition basis),
(b) a hydroxyl number estimated to be about 0, and
(c) an acid number estimated to be about 500–700,
and wherein the other components are believed to be within the ranges for a more preferred phthalic anhydride bottoms starting composition as shown in Table I of my earlier filed U.S. patent application U.S. Ser. No. 507,532 filed June 27, 1983.

To a three-liter, four-neck, round-bottom flask equipped with a stirrer, thermometer, nitrogen inlet tube, and a gooseneck condenser, there is added at ambient temperature and pressure 740 grams (about 3 moles) of the above phthalic anhydride bottoms in a pulverized form followed by 1060 grams (about 10 moles) of diethylene glycol. The mixture is heated to 220 C. and kept at this temperature until the acid number of the reaction mixture is found to be not more than about 7.0, and then sufficient diethylene glycol is removed from the reaction zone to achieve the final product hydroxyl and viscosity values. The reaction product is an ester polyol composition which, when cooled to room temperature, is a black liquid that is found to have a hydroxyl number of about 312 and a viscosity of about 25,000 centipoises at 25° C. measured using a Brookfield viscometer (model RVF) with a #6 spindle operating at about 10 rpm. Details for this Example are summarized in Table III below.

TABLE III

| | Reactants | | Process Conditions | | Product Characteristics[1] | | |
|---|---|---|---|---|---|---|---|
| Example Number | Wt. of Phthalic Anhydride Bottoms (grams) | Wt. of Diethylene Glycol (grams) | Reaction Temp. (°C.) | Reaction Time (hrs) | Acid Number | Hydroxyl Number | Viscosity CPS at 25° C. |
| 1 | 740 | 1060 | 220 | 11.0 | 7.0 | 312 | 25,000 |
| 2[2] | 740 | 1060 | 220 | 5.0 | 0.5 | 226 | 61,000 |
| 3[2] | 740 | 1060 | 220 | 4.0 | 5.5 | 215 | 137,000 |
| 4 | 725 | 1060 | 195 | 9.5 | 6.0 | 324 | 9,000 |
| 5 | 745 | 1060 | 195 | 15.0 | 4.5 | 310 | 6,000 |
| 6 | 743 | 1060 | 220 | 4.5 | 1.0 | 300 | 8,000 |
| 7 | 746 | 1061 | 239 | 4.0 | 5.0 | 335 | 4,800 |
| 8 | 750 | 1074 | 240 | 3.5 | 2.5 | 390 | 4,000 |

Table III Footnotes:
[1] In each example, the product ester polyol composition is believed to be comprised of components at least 50 weight percent (on a 100 weight percent total composition basis) of which have aromatic nuclei, and at least two terminal hydroxyl groups per molecule, and at least two ester groups per molecule. In each example, the product ester polyol composition is believed to contain from about 2 to 30 weight percent (on a 100 weight percent product basis) of excess unreacted residual diethylene glycol. In general, for a given product, the lower the content of residual diethylene glycol, the lower the hydroxyl number and the higher the viscosity thereof.
[2] 100 parts per million based upon total charge of stannous octoate added as an esterification catalyst in these examples.

EXAMPLES 2-8

The procedure of Example 1 is repeated using different conditions to prepare various product ester polyol compositions. The details including weight of charges, reactant ratios, and product characteristics are summarized in Table III above. The reaction product in each instance is believed to contain diethylene glycol phthalate.

Each of the products of Examples 1-8 is reactive with isocyanates to produce polyurethane and polyisocyanurate foam products.

EXAMPLE 9

The phthalic anhydride bottoms composition of Example 1 is reacted with 1,1,1-trimethylolpropane as follows:

To a 5 liter, four-neck, round-bottom flask equipped with a stirrer, thermometer, nitrogen inlet tube, and a gooseneck condenser, there is added 1480 grams (about 6 moles) of phthalic anhdyride bottoms and 2680 grams (20 moles) of trimethylolpropane. The mixture is heated to 190° C. with stirring and kept at this temperature until the acid number is 5. The reaction product (an ester polyol composition) is then cooled to room temperature and analyzed. The hydroxyl number is found to be 565.2. The black product is a gel-like material at 25° C. which contains compounds with the structural formula:

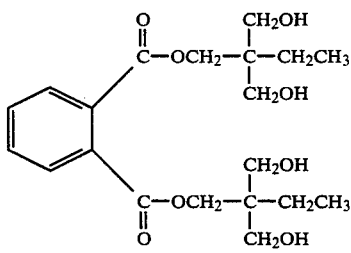

At least 50 weight percent of such product (100 weight percent total basis) is believed to comprise compounds which have an aromatic nucleus and which contain at least 2 hydroxyl groups per molecule. This reaction product is believed to contain from about 2 to 15 weight percent of the unreacted trimethylolpropane.

This product is suitable for formulating with blowing agents, catalysts, and other polyols for reaction with isocyanates to produce useful foams.

EXAMPLE 10

For comparison purposes, a substantially pure diethylene glycol phthalate diester diol is prepared as follows:

Phthalic anhydride, believed to be of 99.7 weight percent purity (total composition basis) having a hydroxyl number of about 0 and an acid number of about 750 is obtained and 746 grams thereof (about 5 moles) is charged to a three-liter, four-neck, round-bottom flask equipped with a stirrer, thermometer, nitrogen inlet tube, and a goose-neck condenser at ambient temperature and pressure, followed by 10 grams (about 10 moles) of diethylene glycol. This mixture is heated at 239° C. and kept at this temperature until the acid number of the reaction mixture is found to be about 2.9 (about 4 hours). The reaction product is believed to comprise diethylene glycol phthalate and is in the form of a pale yellow liquid at room temperature having a hydroxyl number of about 323 and a viscosity of about 2500 centipoises at 25° C. [measured using a Brookfield viscometer (model RVF) with a #6 spindle operating at about 10 rpm]. The reaction product has a saponification value of 319, an ester value of 316, and an unknown acetone insolubles content of 4.24 weight percent (100 weight percent total product basis). This reaction product also contains about 13.1 weight percent (total weight basis) of diethylene glycol.

EXAMPLE 11 (A,B,C,D,E,F,G)

Samples identified as A, B, C, D, F, and G of the ester polyol of Example 1, and a sample identified as E of Example 10, are each blended with various of the ingredients shown in Table IV below to produce resin blends. Then a portion of each respective resin blend is admixed using a high speed drill press motor equipped with a stirrer blade with a polymeric isocyanate (polymethylene polyphenylisocyanate), Mondur MR from Mobay Chemical Co., to produce a polyurethane-polyisocyanurate type foam.

The product foam produced in each case is characterized by a very fine cell structure with minimal surface friability and high load bearing properties which is considered surprising in the case of the foams mad with the resin blends A, B, C, and D that are derived from an ester polyol composition used in this invention. The compositions used are summarized in Table IV below.

The product foam from resin blend E contains only the diethylene glycol phthalate of Example 10. This product foam is similar in its properties to the product foam from the resin blend A which, like the resin blend E, is believed to contain very little diethylene glycol. In order to dissolve the fluorocarbon blowing agent ("Freon 11B") in each of the resin blends A and E, it is desirable to use more ethoxylated octyl phenol ("Triton X-100") than is needed to dissolve the same fluorocarbon blowing agent in each of the resin blends B, C, and D which each contain diethylene glycol. The ethoxylated octyl phenol and the diethylene glycol may function as compatibility agents in these resin blends.

The resin blends B, C, and D are easier to produce compared to the blends A and E apparently because the presence of the diethylene glycol in the case of blends B, C, and D aids in the blending operation.

When combined with the isocyanate, each of the resin blends B, C, and D exhibits a shorter initial cream time and a shorter tack free time than do the respective resin blends A and E for comparable catalyst quantities.

Considering each of the product foams produced, those foams resulting from resin blends B, C, and D appear to have a better blush and less friability than do those foams resulting from resin blends A and E.

The hydroxyl number of each of the resin blends B, C, and D is greater than the hydroxyl number of each of the resin blends A and E which is believed to be a consequence of the presence of the higher concentration of diethylene glycol in such resin blends B, C, and D.

By changing the weight ratio of isocyanate to resin formulations from those shown in Table IV to a value of about 50/50, product polyurethane-type foams of each such resin blend A through E are produced. Each product foam likewise has a very fine cell structure with minimal surface friability and high load bearing properties.

Each of the products of Examples 2-8 (see Table III) when similarly prepared and reacted with an isocyanate produces polyurethane and polyisocyanurate foam products.

insolubles of about 35 weight percent (total composition basis) and a saponification value of about 380.

TABLE IV

| Component | Resin Blend Formulation (100 wt % basis) | | | | | | |
|---|---|---|---|---|---|---|---|
| | A | B | C | D | E | F | G |
| Ester Polyol, Ex. 1 | 32.6 | 29.4 | 46.0 | 42.6 | — | 44.0 | 37.3 |
| Ester Polyol, Ex. 9 | — | — | — | — | 34.0 | — | — |
| Diethylene glycol | — | 5.2 | 2.4 | 5.8 | — | — | — |
| "DC-193"[1] | 2.0 | 2.0 | 2.6 | 2.6 | 2.0 | 3.0 | 2.0 |
| "Triton X-100"[2] | 14.7 | 12.7 | — | — | 13.0 | — | — |
| "Antiblaze 80"[3] | 12.6 | 12.6 | — | — | 14.0 | — | 12.6 |
| "DABCO TMR-2"[4] | 2.0 | 2.0 | — | — | 2.0 | 3.0 | 2.0 |
| "DMP-30"[5] | 0.5 | 0.5 | — | — | 1.0 | 1.0 | 0.5 |
| "Catalyst T-45"[6] | 1.5 | 1.5 | — | — | — | — | 1.5 |
| "Freon 11B"[7] | 34.1 | 34.1 | 31.5 | 31.5 | 34.0 | 33.0 | 34.1 |
| "Curithane 97"[8] | — | — | 5.4 | 5.4 | — | — | — |
| "Tergitol XD"[9] | — | — | — | — | — | — | 10.0 |
| "Varonic K-215"[10] | — | — | 12.1 | 12.1 | — | — | — |
| "Ethoxylated Cocamide"[11] | — | — | — | — | — | 16.0 | — |
| Weight Ratio A/B[12] | 60/40 | 60/40 | 60/40 | 58.1/41.9 | 60/40 | 66/34 | 60/40 |
| Density, pcf | 2.10 | 2.23 | 1.7 | 1.8 | 1.86 | 2.02 | 2.00 |

Table IV Footnotes:
[1]"DC-193" is a trademark for dimethylpolysiloxane, polyalkylene oxide copolymer available commercially from Dow Corning.
[2]"Triton X-100" is a trademark for ethoxylated octylphenol available commercially from Rohm and Haas believed to contain about 10–15 combined moles of ethylene oxide per molecule.
[3]"Antiblaze 80" is a trademark for tris (B-chloropropyl)-phosphate available commercially from Mobil Chemical Company.
[4]"DABCO TMR-2" is a trademark for polyisocyanurate catalyst available commercially from Air Products Company.
[5]"DMP-30" is a trademark for 2,4,6-tri(dimethylaminomethyl) phenol available commercially from Rohm and Haas.
[6]"Catalyst T-45" is a trademark for 50% potassium octoate in dipropylene glycol available commercially from M&T Chemicals.
[7]"Freon 11B" is a trademark for trichlorofluoromethane available commercially from E. I. duPont de Nemours and Company.
[8]"Curithane 97" is a trademark for polyisocyanurate catalyst available commercially from Upjohn Company.
[9]"Tergitol XD" is a trademark for alkoxylated (mixed ethylene oxide propylene oxide) butanol available commercially from Union Carbide Corporation.
[10]"Varonic K-215" is a trademark for ethoxylated cocoamine available commercially from Sherex Chemical Company.
[11]"Ethoxylated Cocamide" is available commercially as amidox C-5 from Stepan Company.
[12]This ratio designates the weight ratio of isocyanate (designated as "A") to the weight ratio of resin formulation containing polyol product of Example 1 (designated as "B").

EXAMPLE 12

A heated specimen of a phthalic anhydride bottoms composition having (a) a phthalic anhydride content of about 60 weight percent (total composition basis), (b) a hydroxyl number estimated to be about zero, and (c) an acid number estimated to be about 500 is charged to a 60 gallon stainless steel reactor equipped with an agitator, thermocouple for measuring temperature, nitrogen inlet tube, and a distillation column. To the reactor is added at ambient pressure 148 pounds (about 1 pound mole) of such above-identified phthalic anhydride bottoms and 328 pounds (about 3.09 pound mole) of diethylenglycol. The mixture is heated to 223° C. and kept at this temperature until the acid number of the reactant mixture is found to be about 5.5 (about 14 hours). The reaction product (an ester polyol composition) is then cooled to ambient temperature, and hydroxyl number, and viscosity values thereof are determined. The hydroxyl number is found to be about 329, and the viscosity of the black liquid product is found to be about 15,500 centipoises at 25° C. measured using Brookfield viscometer (model RVF) with a #6 spindle at a speed of 10 rpm. Ester polyol composition being characterized by containing organic compounds at least 50 weight percent (on a 100 weight percent total composition basis) of which have aromatic nuclei, at least two terminal hydroxyl groups per molecule, and at least two ester groups per molecule. This reaction product is believed to contain about 10.6 weight percent (total composition basis) of unreacted diethylene glycol. In addition, this reaction product had a content of unknown acetone This product behaves similarly to the product of Example 1 with respect to its foam forming characteristics when it is formulated as shown in Example A of TABLE IV above with ethoxylated alkyl phenol.

EXAMPLE 13

A heated specimen of a phthalic anhydride bottoms composition having (a) a phthalic anhydride content of about 60 weight percent (total composition basis), (b) a hydroxyl number estimated to be about zero, and (c) an acid number estimated to be about 500 is charged to a 60 gallon stainless steel reactor equipped with an agitator, thermocouple for measuring temperature, nitrogen inlet tube, and a distillation column. To the reactor is added at ambient pressure 229 pounds (about 1 pound mole) of such above-identified phthalic anhydride bottoms and 305 pounds (about 2.88 pound mole) of diethylene glycol. The mixture is heated to 225° C. and kept at this temperature until the acid number of the reactant mixture is found to be about 4 (about 15 hours). The reaction product (an ester polyol composition) is then cooled to ambient temperature, and hydroxyl number, and viscosity values thereof are determined. The hydroxyl number is found to be about 320, and the viscosity of the black liquid product is found to be about 16,800 centipoises at 25° C. measured using a Brookfield viscometer (model RVF) with a #6 spindle at a speed of 10 rpm. The ester polyol composition is characterized by containing organic compounds at least 50 weight percent (on a 100 weight percent total composition basis) of which have (a) aromatic nuclei, (b) at least two terminal hydroxyl groups per molecule, and (c) at least two ester groups per molecule. The reaction product is believed to contain about 15.8 weight percent (total composition basis) of unreacted diethylene glycol. In addition, this reaction product had a content of unknown acetone insolubles of about 15.6 weight percent (total composition basis) and a saponification value of about 317.

This product behaves similarly to the product of Example 1 with respect to its foam forming characteristics.

starting phthalic anhydride bottoms composition, product ester polyol compositions are produced which can be formulated with a formula (2) agent and with blowing agent and catalyst to produce resin blends that can then be reacted with isocyanate to produce useful foams.

Having now fully described the invention, it will be apparent to one of ordinary skill in the art that many changes and modifications can be made thereto without departing from the spirit or scope of the invention as set forth herein.

TABLE V

| Ident. No. | Component or Property | Magnus Polyol of Example No. | | | | | | | | | | |
|---|---|---|---|---|---|---|---|---|---|---|---|---|
| | | 1 | 2 | 3 | 4 | 5 | 6 | 7 | 8 | 9 | 12 | 13 |
| 1 | diethylene glycol content (wt %) | 15.6 | 3.4 | 6.6 | 16.5 | 13.9 | 12.7 | 19.6 | 19.0 | — | 10.6 | 15.8 |
| 2 | hydroxyl number | 312 | 226 | 215 | 324 | 310 | 300 | 355 | 390 | 565.2 | 329 | 320 |
| 3 | acid number | 7.0 | 0.5 | 5.5 | 6.0 | 4.5 | 1.0 | 5.0 | 2.5 | — | 5.5 | 4.4 |
| 4 | saponification number | 323 | 365 | 323 | 302 | 304 | 321 | 298 | 306 | — | 380 | 317 |
| 5 | ester value[1] | 316 | 364.5 | 317.5 | 296 | 299.5 | 320 | 293 | 303.5 | — | 374.5 | 312.6 |
| 6 | unknown acetone insolubles content (wt %) | 18.2 | 24.3 | 11.3 | 11.7 | 7.2 | 14.7 | 12.2 | 11.1 | 10–20 | 35.0 | 15.6 |
| 7 | viscosity, cps | 25000 | 61000 | 13700 | 9000 | 6000 | 8000 | 4800 | 4000 | — | 15000 | 16800 |
| 8 | 1,1,1-trimethylol propane content (wt %) | — | — | — | — | — | — | — | — | 2–15 | — | — |
| 9 | mole ratio of bottoms to polyol[2] | 1:3.1 | 1:3.1 | 1:3.1 | 1:3.1 | 1:3.1 | 1:3.1 | 1:3.1 | 1:3.1 | 1:3.1 | 1:3.3 | 1:3.3 |

Table V Footnotes:
[1]The term "ester value" references the number of milligrams of potassium hydroxide needed to react with the ester groups present in one gram of sample minus the number of milligrams of potassium hydroxide required to neutralize the acid material present in one gram of sample.
[2]The term "mole ratio of bottoms to polyol" references the calculated molar quantity of carboxylic compounds to formula (1) polyol molar quantity in any given example. The carboxylic compounds are assumed to be a 50/20 ratio of phthalic anhydride to trimellitic anhydride.

TABLE VI

| Sample Component | Resin Blend Formulation | | | | | | | | | |
|---|---|---|---|---|---|---|---|---|---|---|
| | A | B | C | D | E | F | G | H | I | J |
| Ester polyol, Example 1 | 60.5 | 48.4 | 48.4 | 48.4 | 42.4 | 48.4 | 48.4 | 42.4 | 48.4 | 48.4 |
| DC-193 | 2.6 | 2.6 | 2.6 | 2.6 | 2.6 | 2.6 | 2.6 | 2.6 | 2.6 | 2.6 |
| Curithane 97 | 5.4 | 5.4 | 5.4 | 5.4 | 5.4 | 5.4 | 5.4 | 5.4 | 5.4 | 5.4 |
| Freon 11B | 31.5 | 31.5 | 31.5 | 31.5 | 31.5 | 31.5 | 31.5 | 31.5 | 31.5 | 31.5 |
| Triton X-100 | — | — | — | 12.1 | — | — | — | — | — | — |
| Makon 6[(1)] | — | 12.1 | — | — | — | — | — | 12.1 | 6.0 | — |
| Makon 14[(1)] | — | — | 12.1 | — | — | — | — | — | — | 6.0 |
| Ethonix 1214-6.5[(2)] | — | — | — | — | 12.1 | — | — | — | — | — |
| Varonic K-215 | — | — | — | — | — | 12.1 | — | — | 6.1 | — |
| Amidox C-5 | — | — | — | — | — | — | 12.1 | — | — | 6.1 |
| Tergitol XD[(3)] | — | — | — | — | — | — | — | 6.0 | — | — |

Table VI Footnotes:
[(1)]"Makon 6 and Makon 14" are trademarks for ethoxylated alkyl phenol available commercially from Stepan Company.
[(2)]"Ethonix 1214-6.5" is a trademark for ethoxylated alkyl alcohols available commercially from Ethyl Corporation.
[(3)]"Tergitol XD" is a trademark for alkoxylated butanol available commercially from Union Carbide Corporation.

The products of Examples 1-8, and 11-13 are analyzed further, and the combined results are shown in Table V below. Liquid chromatographic analysis confirms the qualitative similarity between the respective compositions of Examples 1-9 and 11-13.

Additional samples of ester polyol, Example 1, blended with various ingredients are shown in Table VI below. When a portion of each respective resin blend was admixed using a high speed drill press motor equipped with a stirrer blade with a polymeric isocyanate (polymethylene polyphenylisocyanate), Mondur MR from Mobay Chemical Co., the foams produced in each case, except sample A, have a fine uniform cell structure. In the case of sample A the foam has a large course nonuniform cell structure.

When other polyols of formula (1), such as ethylene glycol, tetraethylene glycol, glycerine, pentaerythritol, and 2,2-dimethyl-1,3,-propanediol, are reacted with a

I claim:
1. A resin prepolymer blend comprising on a 100 weight percent total composition basis:
(A) from about 25 to 50 weight percent of an ester polyol composition,
(B) from about 2 to 45 weight percent of at least one polyol of the formula:

$$HO-R^1-OH$$

wherein $R^1$ is a divalent radical selected from the group consisting of:
(1) alkylene radicals each containing from 2 through 6 carbon atoms,
(2) radicals of the formula:

$$-CH_2-R^2-CH_2-$$

where $R^2$ is a radical selected from the group consisting of:

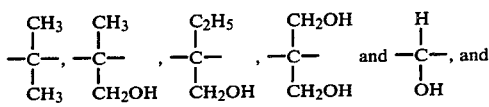

(3) radicals of the formula:

$$-(R^3O)_n-R^3-$$

where $R^3$ is an alkylene radical containing from 2 through 3 carbon atoms, and n is an integer of from 1 through 3 inclusive, and (c) from about 5 to 30 weight percent of at least one nonionic polyalkoxylated compound of the formula:

$$RO(Y)_n-H$$

wherein:

R is a radical selected from the group consisting of alkyl phenyl radicals wherein the alkyl group in each such radical contains from about five to eighteen carbon atoms; alkyl radicals each containing from seven through eighteen carbon atoms;

Y is selected from the group consisting of radical of the formula: $(CH_2CH_2O)$, and mixed radicals of the formula

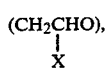

where the mole ratio of $(CH_2CH_2O)$ to

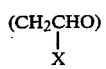

ranges from 1:1 to 1:15, x is selected from the group consisting of methyl and hydrogen, n is a positive whole number ranging from about 4 to 25, said ester polyol composition being characterized by containing on said dtotal composition basis:

(A') from about 7.0 to 45 weight percent of acetone insolubles, and (B') from about 55 to 93 weight percent of esters produced by the reaction of phthalic anhydride with said polyol, said ester polyol composition having been produced by contacting a phthalic anhydride bottoms composition with at least one said polyol while maintaining liquid phase reaction conditions and a temperature ranging from about 190° to 250° C., the initial mole ratio of said polyol to said phthalic anhydride bottoms composition at the time of said contacting ranges from about 2 to 4 based on an estimate of the total carboxylic acid and carboxylic acid anhydride content of said phthalic anhydride bottoms composition.

2. The blend of claim 1 additionally containing dissolved therein from about 25 to 40 weight percent of a low molecular weight fluorinated alkane on the same basis.

3. The blend of claim 1 additionally containing dissolved therein from about 0.5 to 3 weight percent of a dimethyl polysiloxane polyalkylene oxide copolymer on the same basis.

4. The blend of claim 1 additionally containing dissolved therein from about 1 to 7 weight percent of a polyisocyanurate catalyst on the same basis.

5. The blend of claim 1 additionally containing dissolved therein from greater than 0 up to about 15 weight percent of a flame retardant on the same basis.

6. The blend of claim 1 wherein said nonionic polyalkoxylated compound comprises an ethoxylated alkyl phenol.

7. The blend of claim 1 additionally containing on the same basis from greater than 0 up to about 20 weight percent of at least one diol of the formula:

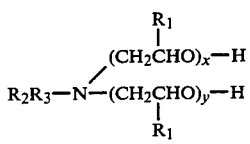

wherein each $R_1$ is independently selected from the group consisting of hydrogen and methyl, $R_2$ is an aliphatic radical having from 7 to 35 carbon atoms inclusive, $R_3$ is a divalent radical selected from the group consisting of

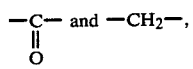

and x and y are each a positive whole number having an average value between about one and twenty inclusive.

8. The blend of claim 7 wherein said diol comprises an ethoxylated cocoamine containing from about 5 to 15 moles of combined ethylene oxide per molecule.

9. The blend of claim 7 wherein said diol comprises an ethoxylated cocamide containing from about 5 to 15 moles of combined ethylene oxide per molecule.

10. The blend of claim 1 wherein, in said ester polyol composition, said polyol is diethylene glycol.

11. The blend of claim 1 wherein said blend is further characterized by having:

(A) an hydroxyl number ranging from about 190 to 600, (B) an acid number ranging from about 0.01 to 7, (C) a saponification value ranging from about 200 to 425, (D) a viscosity ranging from about 10,000 to 150,000 centipoises at 25° C. measured with a Brookfield viscometer with a #6 spindle operating at about 10 r.p.m.

12. A resin blend for reacting with an isocyanate to produce a foam comprising on a 100 weight percent total composition basis:

| Component | (100 wt % basis) |
|---|---|
| (1) ester polyol composition | 25–50 |

-continued

| Component | (100 wt % basis) |
| --- | --- |
| (2) total content of unreacted diethylene glycol | 2–35 |
| (3) low molecular weight fluorinated alkane | 25–40 |
| (4) ethoxylated alkyl phenol | 5–20 |
| (5) dimethylpolysiloxane polyalkylene oxide copolymer | 0.5–3 |
| (6) polyisocyanurate catalyst | 1–7 |
| (7) flame retardant | 0–15 |
| (8) ethoxylated cocoamine | 0–20 | said ester polyol composition being characterized by containing on said total composition basis:
(A) from about 7.0 to 45 weight percent of acetone insolubles, and
(B) from about 55 to 93 weight percent of esters produced by the reaction of phthalic anhydride with diethylene glycol,
said ester polyol composition having been produced by contacting phthalic anhydride bottoms composition with at least one polyol while maintaining liquid phase reaction conditions and a temperature ranging from about 190° to 250° C. using an initial mole ratio of said diethylene glycol to said phthalic anhydride bottoms composition of form about 2 to 4 based on an estimate of the total carboxylic acid and carboxylic acid anhydride content of said phthalic anhydride bottoms composition, said polyol having the formula:

$$HO-R^1-OH$$

wherein $R^1$ is a divalent radical selected from the group consisting of:
(1) alkylene radicals each containing from 2 through 6 carbon atoms,
(2) radicals of the formula:

$$-CH_2-R^2-CH_2-$$

where $R^2$ is a radical selected from the group consisting of:

$$-\overset{CH_3}{\underset{CH_3}{C}}-, -\overset{CH_3}{\underset{CH_2OH}{C}}-, -\overset{C_2H_5}{\underset{CH_2OH}{C}}-, -\overset{CH_2OH}{\underset{CH_2OH}{C}}- \text{ and } -\overset{H}{\underset{OH}{C}}-, \text{ and}$$

(3) radicals of the formula:

$$-(R^3O)_n-R^3-$$

where $R^3$ is an alkylene radical containing from 2 through 3 carbon atoms, and n is an integer of from 1 through 3 inclusive.

* * * * *